US009735907B2

(12) United States Patent
Makishima et al.

(10) Patent No.: US 9,735,907 B2
(45) Date of Patent: Aug. 15, 2017

(54) TRANSMISSION DEVICE

(71) Applicant: FUJITSU LIMITED, Kawasaki-shi, Kanagawa (JP)

(72) Inventors: Hiromichi Makishima, Oyama (JP); Hidetaka Kawahara, Shimotsuga (JP); Yuji Obana, Shimotsuga (JP); Kazumasa Mikami, Oyama (JP); Wataru Odashima, Oyama (JP); Shingo Hotta, Yokohama (JP); Hiroyuki Kitajima, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/919,910

(22) Filed: Oct. 22, 2015

(65) Prior Publication Data
US 2016/0142799 A1    May 19, 2016

(30) Foreign Application Priority Data

Nov. 19, 2014   (JP) ................................ 2014-234403

(51) Int. Cl.
*H04Q 11/00* (2006.01)
*H04J 14/08* (2006.01)
*H04J 3/16* (2006.01)
*H04J 3/00* (2006.01)

(52) U.S. Cl.
CPC ................................ *H04J 3/1652* (2013.01)

(58) Field of Classification Search
None
See application file for complete search history.

(56) References Cited

U.S. PATENT DOCUMENTS

| 4,894,821 | A  | * | 1/1990 | Hayano | H04Q 11/06 370/371 |
| 6,931,002 | B1 | * | 8/2005 | Simpkins | H04L 12/6402 370/354 |
| 7,492,760 | B1 | * | 2/2009 | Plante | H04Q 11/04 370/363 |
| 7,573,889 | B1 | * | 8/2009 | Milliken | H04L 47/10 370/395.4 |
| 8,271,672 | B1 | * | 9/2012 | Zhang | H04L 47/522 709/231 |

(Continued)

FOREIGN PATENT DOCUMENTS

JP    2012-209754    10/2012

*Primary Examiner* — Oommen Jacob
(74) *Attorney, Agent, or Firm* — Staas & Halsey LLP

(57) ABSTRACT

A transmission device to multiplex in a first signal a plurality of second signals each having a low rate as compared with the first signal, the transmission device includes: a plurality of memories to store the plurality of second signals; a selector to select one of the second signals read from the plurality of memories; and a controller to control read timing to read the plurality of second signals from the plurality of memories and signal selection timing to select the one of the second signals by the selector so as to execute rearrangement processing of the plurality of second signals read from the plurality of memories in accordance with cross-connect setting information for the plurality of second signals and shift processing of the plurality of second signals read from the plurality of memories in accordance with multiplexing positions of the plurality of second signals for the first signal.

4 Claims, 15 Drawing Sheets

(56) References Cited

U.S. PATENT DOCUMENTS

| | | | |
|---|---|---|---|
| 2003/0043828 A1* | 3/2003 | Wang | H04L 12/5601 |
| | | | 370/412 |
| 2007/0121499 A1* | 5/2007 | Pal | H04L 45/60 |
| | | | 370/230 |
| 2008/0056336 A1* | 3/2008 | Toyoda | H04L 7/0337 |
| | | | 375/219 |
| 2010/0246607 A1* | 9/2010 | Kawajiri | H04J 3/047 |
| | | | 370/498 |
| 2010/0318749 A1* | 12/2010 | Matthews | G11C 7/1015 |
| | | | 711/149 |
| 2012/0230348 A1* | 9/2012 | Pannell | H04L 47/6215 |
| | | | 370/437 |
| 2012/0251127 A1 | 10/2012 | Ohkubo et al. | |
| 2012/0257461 A1* | 10/2012 | Kim | G11C 29/022 |
| | | | 365/189.05 |
| 2016/0142799 A1* | 5/2016 | Makishima | H04J 3/00 |
| | | | 398/52 |

* cited by examiner

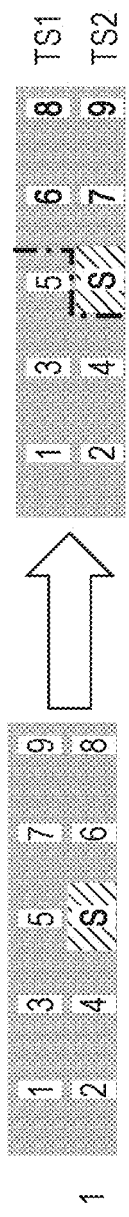
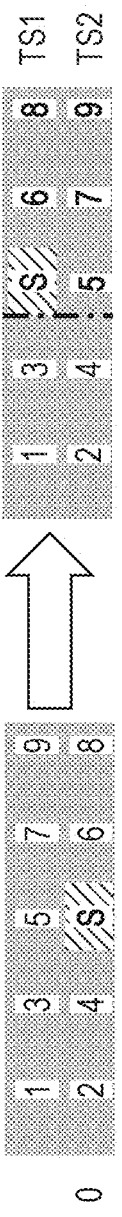
FIG. 8A
FIG. 8B

| MFAS bit 8 | TSOH 1.25G TS |
|---|---|
| 0 | 1 |
| 1 | 2 |

| MFAS bits 6 7 8 | TSOH 1.25G TS |
|---|---|
| 0 0 0 | 1 |
| 0 0 1 | 2 |
| 0 1 0 | 3 |
| 0 1 1 | 4 |
| 1 0 0 | 5 |
| 1 0 1 | 6 |
| 1 1 0 | 7 |
| 1 1 1 | 8 |

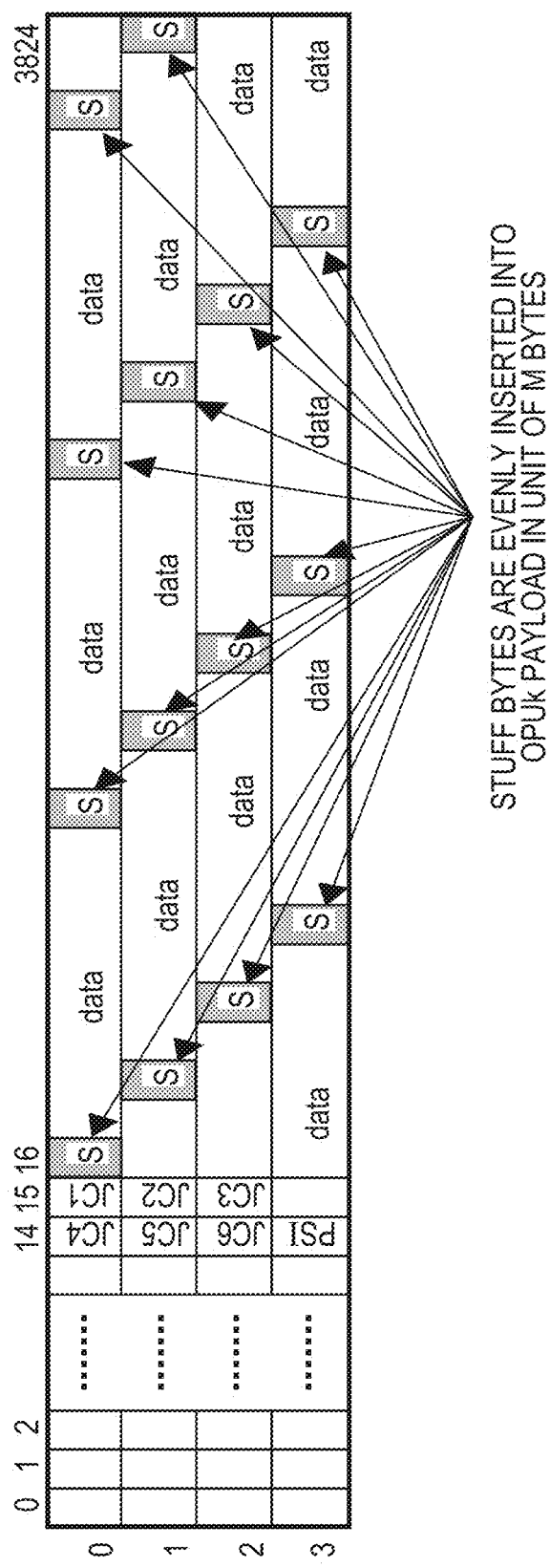

TRANSMISSION DEVICE

CROSS-REFERENCE TO RELATED APPLICATION

This application is based upon and claims the benefit of priority of the prior Japanese Patent Application No. 2014-234403, filed on Nov. 19, 2014, the entire contents of which are incorporated herein by reference.

FIELD

The embodiments discussed herein are related to a transmission device.

BACKGROUND

As an example of an optical transmission technology, there is an optical transport network (OTN) transmission technology. In the OTN transmission technology, for example, a plurality of low-speed signals called LO-ODU signals are multiplexed (may be referred to as "mapped") in (to) a higher-speed signal called an HO-ODU signal (or OTN signal), and transmission of the HO-ODU signal is performed.

The reception side of the HO-ODU signal de-multiplexes (may be also referred to as "de-maps") the plurality of LO-ODU signals that have been multiplexed in the received HO-ODU signal. Here, "LO-ODU" is abbreviation of "low order-optical data unit", and "HO-ODU" is abbreviation of "high order-optical data unit".

The HO-ODU signal may be referred to as "high-speed signal", "high-order signal", or "upper layer signal", and the LO-ODU signal may be referred to as "low-speed signal", "low-order signal", or "lower layer signal".

Japanese Laid-open Patent Publication No. 2012-209754 is a related art.

SUMMARY

According to an aspect of the invention, a transmission device to multiplex in a first signal a plurality of second signals each having a low rate as compared with the first signal, the transmission device includes: a plurality of memories configured to store the plurality of second signals; a selector configured to select one of the second signals read from the plurality of memories; and a controller configured to control read timing to read the plurality of second signals from the plurality of memories and signal selection timing to select the one of the second signals by the selector so as to execute rearrangement processing of the plurality of second signals read from the plurality of memories in accordance with cross-connect setting information for the plurality of second signals and shift processing of the plurality of second signals read from the plurality of memories in accordance with multiplexing positions of the plurality of second signals for the first signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B are schematic diagrams illustrating examples of stuff control of an asynchronous mapping procedure (AMP) for an OPU1 signal;

FIG. 9 is a diagram illustrating a format example of the OPU1 signal;

FIG. 10 is a diagram illustrating an overhead (OH) allocation example of the OPU1 signal;

FIG. 11 is a diagram illustrating a format example of an OPU2 signal;

FIG. 12 is a diagram illustrating an OH allocation example of the OPU2 signal;

FIG. 14 is a diagram illustrating an example of stuff control of a generalized mapping procedure (GMP) in a format example of an OPUk signal.

DESCRIPTION OF EMBODIMENTS

Figure 1:
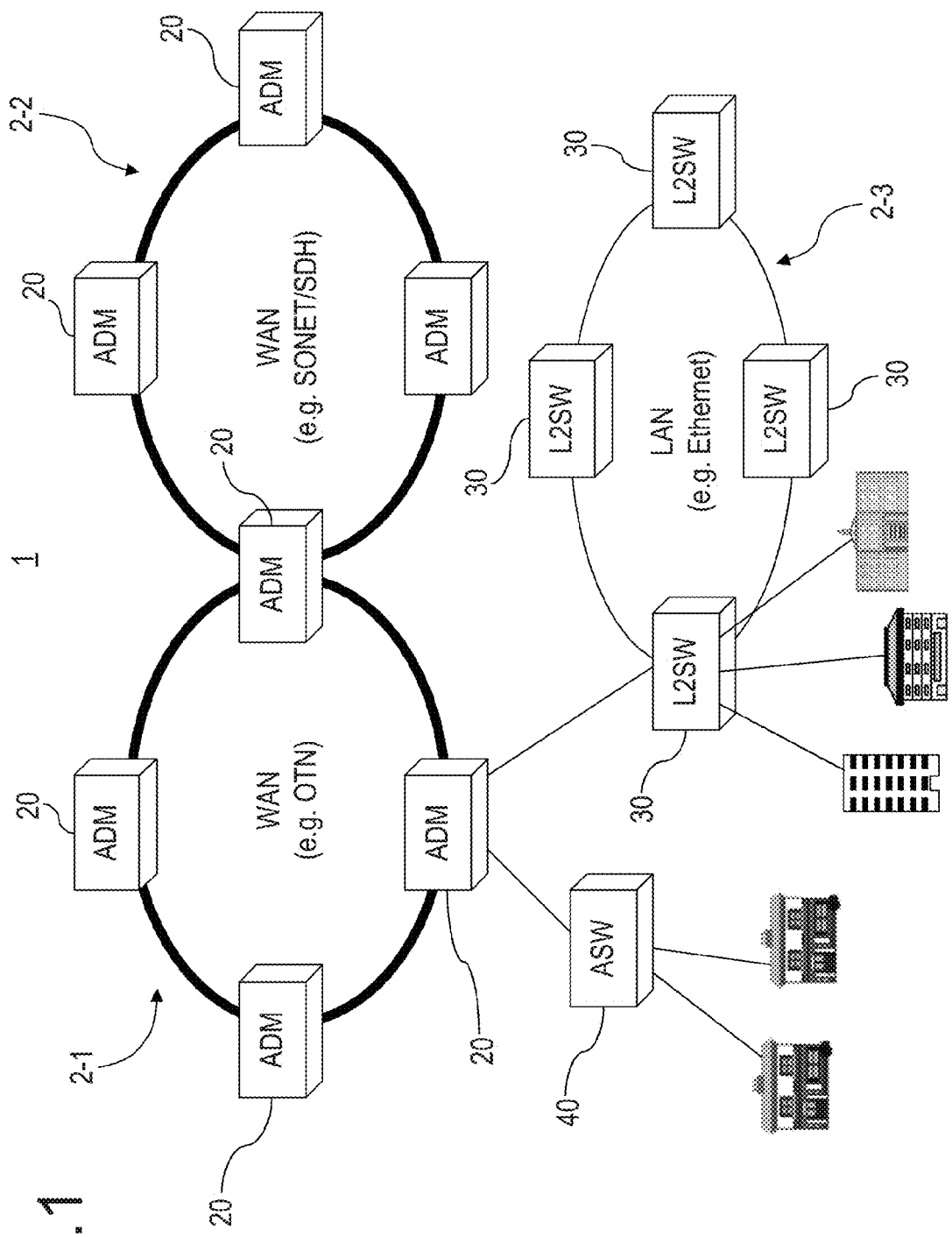
FIG. 1 is a diagram illustrating a configuration example of a communication system according to an embodiment.

A de-multiplexing function of ODU signals is included, for example, in an optical transmission device called an add-drop multiplexer (ADM). The ADM may change a transmission destination (may be referred to as "destination" or "degree") of a reception signal for each LO-ODU signal. In addition, the "degree" may show flexibility of a path selection.

The change in the transmission destination for each LO-ODU signal is achieved, for example, by using a switch by which signals are allowed to be rearranged for each LO-ODU signal. Such a switch may be referred to as a cross-connection switch (XC-SW).

In an existing ADM used for the OTN, when a plurality of LO-ODU signals are rearranged for each destination and is multiplexed in an HO-ODU signal, signal selection processing is executed in the XC-SW by a plurality of times. The XC-SW is achieved, for example, by using a plurality of selectors.

In addition, control of multiplexing position (for example, multiplexing timing) of a signal, which is called "stuff control" is performed as appropriate at the time of multiplexing of LO-ODU signals in an HO-ODU signal. The stuff control may be referred to as "barrel shift", and may be achieved, for example, by delaying (that is, data-shifting) output timing of signal data, using a FIFO memory.

Here, for example, when the number of LO-ODU signals multiplexed in the HO-ODU signal is increased (that is, when the capacity of the HO-ODU signal that is a multiplexing destination is increased), the number of barrel shifts and the number of signal selections in the XC-SW are also increased.

When the number of signal selections and the number of barrel shifts (hereinafter, may be collectively referred to as "signal processing") are increased, a consumption amount of hardware resources such as the selector and the FIFO memory is increased. Therefore, it is probable that the scale of the hardware that achieves the signal processing is increased, and in addition, it is probable that the electric power consumption amount is also increased.

A transmission device according to an embodiment in which the scale of hardware that achieves the signal processing such as cross-connect and barrel shift may be reduced is described below with reference to drawings. However, the embodiments described below are merely examples, and are not intended to exclude application of various modifications and technologies that are not specified below. In addition, various exemplary embodiments described below may be implemented so as to be combined as appropriate. In the drawings used in the following embodiments, portions to which the same reference numeral is applied indicate the same or similar portions, unless otherwise specified.

FIG. 1 is a diagram illustrating a configuration example of a communication system according to an embodiment (may be referred to as "communication network"). A communication system 1 illustrated in FIG. 1 includes, for example, a network 2-1 that supports OTN transmission, a network 2-2 that supports SONET (or SDH) transmission, and an Ethernet 2-3 that supports transmission of Ethernet frames.

The network 2-1 may be referred to as an OTN 2-1, and the network 2-2 may be referred to as a SONET/SDH network 2-2. As illustrated in the example of FIG. 1, both the networks 2-1 and 2-2 may be wide area networks (WANs). In addition, the Ethernet 2-3 may be a local area network (LAN).

"SONET" is abbreviation of "synchronous optical network", and "SDH" is abbreviation of "synchronous digital hierarchy". "SONET" and "SDH" are compatible transmission schemes. "Ethernet" is the registered trademark.

Each of the networks 2-1 and 2-2 includes one or a plurality of ADMs 20, as an example of a network element (NE). The ADM 20 that is the example of the NE may be referred to as "transmission device", "node", "station", or the like. In addition, the network 2-3 includes one or a plurality of layer 2 switches (L2SWs) 30, as an example of a NE. The L2SW may be referred to as "router".

In the example of FIG. 1, each of the networks 2-1 to 2-3 is formed into a ring shape so that the NEs are coupled to each other through a ring-shaped transmission path. However, the configuration of each of the networks 2-1 to 2-3 (may be referred to as "topology") is not limited to the ring network. For example, one of the networks 2-1 to 2-3 may be a mesh network.

As illustrated in FIG. 1, the networks 2-1 and 2-2 are coupled to so as to communicate with each other through one of the ADMs 20. In addition, the OTN 2-1 and the Ethernet 2-3 may be coupled to so as to communicate with each other through a further one of the ADMs 20 in the OTN 2-1. For example, the further ADM 20 of the OTN 2-1 and one of the layer 2 switches 30 of the Ethernet 2-3 are coupled to so as to communicate with each other.

The ADM 20 that couples the network 2-1 and the network 2-2, and the ADM 20 that couples the network 2-1 and the network 2-3 may be referred to as "gateway (GW) node" or simply referred to as "gateway (GW)". Thus, the ADM 20 as a GW may be referred to as "GW-ADM 20", for the sake of convenience.

The GW-ADM 20 that couples the network 2-1 to the network 2-3 may multiplex (map) a plurality of signals received from the Ethernet 2-3 (layer 2 switch 30) in (to) a signal of the OTN 2-1.

The signal received from the Ethernet 2-3 may be an LO-ODU signal. An Ethernet signal is mapped to the payload of the LO-ODU signal. The LO-ODU signal is mapped to the payload of a higher-speed HO-ODU signal. The HO-ODU signal is mapped to the payload of an OTN signal, and transmitted to the OTN 2-1. The HO-ODU signal is an example of a first signal, and the LO-ODU signal is an example of a second signal.

The payload of the HO-ODU signal may be divided into slots each of which is called "tributary slot (TS)", and each of the LO-ODU signals may be mapped to the payload of the HO-ODU signal for each TS.

"Tributary" may correspond to a transmission destination of the LO-ODU signals that have been de-mapped from the HO-ODU signal (that is, a transmission source of the LO-ODU signals mapped to the HO-ODU signal). For example, the Ethernet 2-3 may correspond to "tributary network" of the OTN 1.

"Tributary network" may be referred to as "client network", and a signal transmitted on "client network" may be referred to as "client signal". Therefore, "LO-ODU signal" mapped to the TS of the HO-ODU signal may be referred to as "client signal" or "tributary signal".

The tributary network of the OTN 1 is not limited to the Ethernet 2-3. The SONET/SDH network 2-2 may correspond to "tributary network". In addition, for example, as illustrated in FIG. 1, an aggregate switch (ASW) 40 that aggregates a plurality of communication paths (hereinafter, may be referred to as "paths" or "channels") may be coupled to the ADM 20 of the OTN 1 so as to communicate with the ADM 20. In this case, the communication paths that have been aggregated by the ASW 40 may correspond to "tributary network".

In addition, the GW-ADM 20 may de-map the LO-ODU signals that have been mapped to the payload of the OTN signal (HO-ODU signal) and transmits the de-mapped LO-ODU signals to the Ethernet 2-3 (layer 2 switch).

Figure 2:
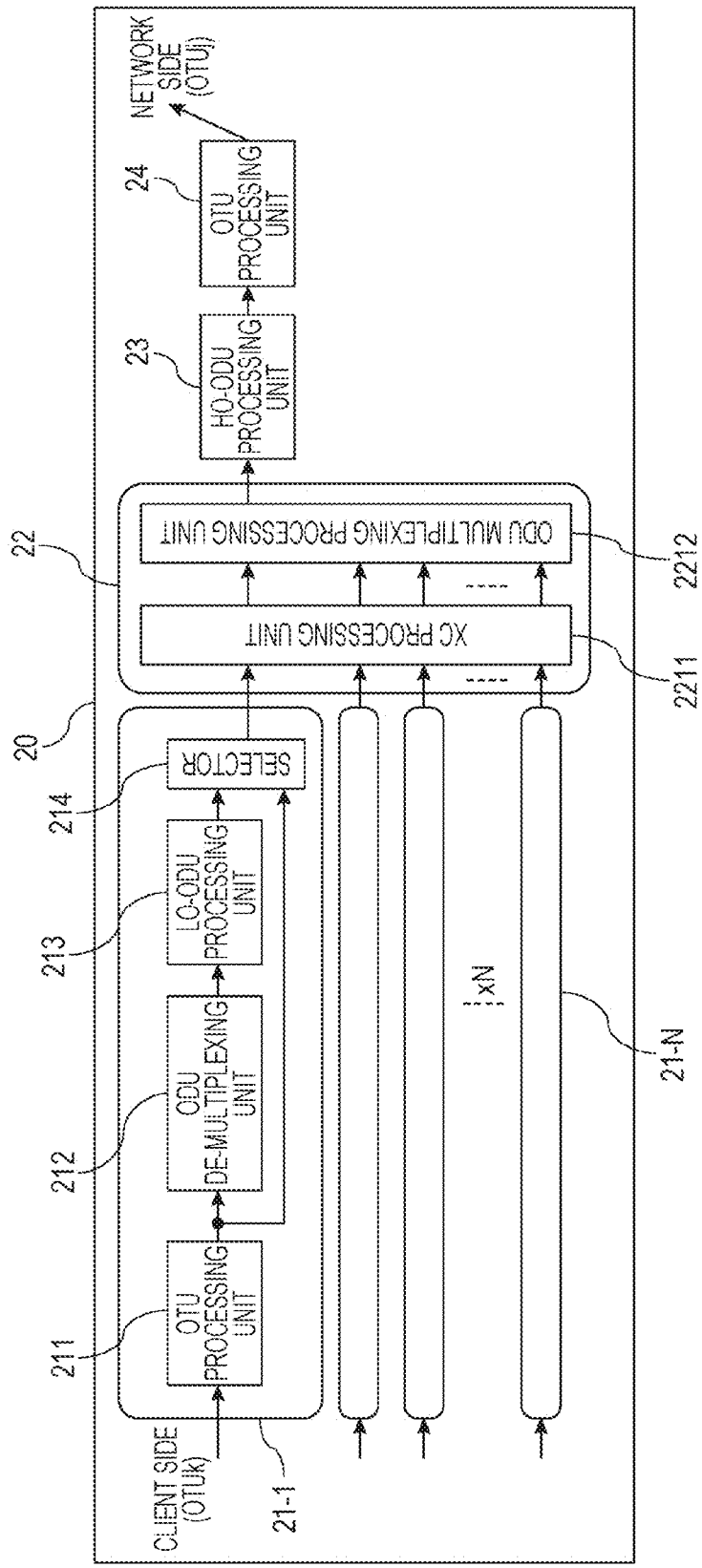
FIG. 2 is a block diagram illustrating a configuration example of an add-drop multiplexer (ADM) illustrated in FIG. 1.

The GW-ADM 20 may include, for example, a cross-connecting function to rearrange signals for each LO-ODU signal (hereinafter, may be referred to as "XC processing"). FIG. 2 is a diagram illustrating a configuration example of the GW-ADM 20 including the XC function.

The GW-ADM 20 illustrated in FIG. 2 includes, for example, N parallel client signal processing units 21-1 to 21-N ("N" is, for example, an integer of two or more), an XC processing unit 2211, an ODU multiplexing processing unit 2212, an HO-ODU processing unit 23, and an OTU processing unit 24. The XC processing unit 2211 and the ODU multiplexing processing unit 2212 form, for example, an example of a signal processing unit 22.

Each of the client signal processing units 21-$i$ ("i" is one of 1 to N) processes an optical channel transport unit-k (OTUk) signal transmitted and received to and from the tributary network.

An ODU signal is mapped to an OTUk signal. When a further ODU signal is mapped to the ODU signal, the "further ODU signal" is referred to as "LO-ODU signal". In addition, the ODU signal to which the LO-ODU signal is mapped is referred to as "HO-ODU signal".

Here, "k" of the OTUk signal (or the ODUk signal) is a value that becomes different depending on the capacity (or bit rate) of the signal (may also be referred to as "order"). For example, "k=0, 1, 2, 3, 4, or the like" is satisfied. It is assumed that the value of "k" indicates "layer".

An ODU0 signal of "k=0" has the capacity of about 1 Gbps, and for example, may be used for signal transmission of 1 Gbps Ethernet.

An OTU1 signal of "k=1" (or ODU1 signal) has the capacity of about 2.4 Gbps, and for example, may be used for signal transmission of OC-48 of SONET (STM-16 of SDH). "OC" is abbreviation of "optical carrier", and "STM" is abbreviation of "synchronous transport module".

An OTU2 signal of "k=2" (or ODU2 signal) has the capacity of about 10 Gbps, and for example, may be used for signal transmission of OC-192 (STM-64) or 10 Gbps Ethernet.

An OTU3 signal of "k=3" (or ODU3 signal) has the capacity of about 40 Gbps, and for example, may be used for signal transmission of OC-768 (STM-256) or 40 Gbps Ethernet.

An OTU4 signal of "k=4" (or ODU4 signal) has the capacity of about 100 Gbps, and for example, may be used for signal transmission of 100 Gbps Ethernet.

In addition, there are an OTU2e signal obtained by extending the capacity of the OTU2 signal, an OTU3e signal obtained by extending the capacity of the OTU3 signal, and the like.

An OTUk signal may be simply referred to as "OTU signal" with "k" being omitted when the value of "k" does not have to be distinguished. Similarly, an ODUk signal may also be simply referred to as "ODU signal" with "k" being omitted when the value of "k" does not have to be distinguished.

As described above, an OTU signal is generated by hierarchically mapping (may be referred to as "capsulizing") client signals having various protocols (may be referred to as "layers") to a higher-speed signal.

Thus, without being aware of the differences of the protocols or the rates of the client signals, the various client signals may be transmitted transparently between networks using OTU signals.

The client signal processing units 21-$i$ may be respectively achieved as client interfaces with different hardware configurations, or a part or all of the client signal processing units 21-$i$ may be achieved as a single client interface. When the client signal processing unit 21-$i$ does not have to be distinguished, the client signal processing unit 21-$i$ may be simply referred to as "client signal processing unit 21".

As illustrated in the example of FIG. 2, the client signal processing unit 21-$i$ includes an OTU processing unit 211, an ODU de-multiplexing unit 212, an LO-ODU processing unit 213, and a selector 214.

The OTU processing unit 211 processes an OTUk signal that has been received from a client network (the processing may be referred to as "OTU-processing"). In the OTU processing, for example, frames of the received OTU signals are synchronized, and various pieces of overhead (OH) information of the OTU signal are processed.

In the OH processing, for example, terminating, monitoring, change (insertion), and the like, of the OH information may be included. "OH information" may be referred to as "OH data" or "OH byte", or simply referred to as "OH".

At the time of execution of the OH processing, the OTU processing unit 211 terminates a forward error correction (FEC) code added to the OTU signal, and converts the OTUk signal into an ODU signal. When the ODU signal is an HO-ODU signal, one or a plurality of LO-ODU signals are multiplexed in the payload of the HO-ODU signal, so that de-multiplexing processing of the multiplexed LO-ODU signals is executed in the ODU de-multiplexing unit 212.

The ODU de-multiplexing unit 212 de-multiplexes (de-maps) the LO-ODU signals that have been multiplexed (mapped) in (to) the payload of the OTU signal (HO-ODU signal). For example, when the OTU signal is an OTU2 signal, eight LO-ODU0 signals are multiplexed in the OTU2 signal at maximum, and when the OTU signal is an OTU1 signal, two LO-ODU0 signals are multiplexed in the OTU1 signal at maximum.

The LO-ODU processing unit 213 processes the LO-ODU signals that have been de-mapped in the ODU de-multiplexing unit 212 (the processing may be referred to as "executes LO-ODU processing"). In the LO-ODU processing, for example, frames of the de-mapped LO-ODU signals is synchronized, and the OHs of the LO-ODU signals are processed.

The selector 214 selects one of an output of the OTU processing unit 211 and an output of the LO-ODU processing unit 213, and outputs the selected signal to the signal processing unit 22 (XC processing unit 2211). That is, the selector 214 may selectively output the LO-ODU signals that have been subject to the pieces of processing in the ODU de-multiplexing unit 212 and the LO-ODU processing unit 213 and the HO-ODU signal that has bypassed the pieces of processing, to the XC processing unit 2211. When the bypass does not have to be performed, the selector 214 may become redundant.

The signal selection by the selector 214 may be controlled, for example, by a device control unit that is not illustrated. The device control unit may control the entire operation of the GW-ADM 20, and may be obtained using a processor circuit, a processor device, or the like, including a calculation ability.

The XC processing unit 2211 includes a plurality of input ports and a plurality of output ports, and selects and outputs (performs cross-connect) the LO-ODU signal that has been input to one of the input ports from the corresponding client signal processing unit 21 (selector 214), to one of the output ports for each of the signals. Due to the cross-connect, the LO-ODU signals, into each of which the OH has been inserted, are rearranged in the LO-ODU processing unit 213.

The ODU multiplexing processing unit 2212 multiplexes the LO-ODU signals that have been subjected to the cross-connect in the XC processing unit 2211, with each other, and outputs the multiplexed LO-ODU signals to the HO-ODU processing unit 23.

The HO-ODU processing unit 23 adds (may be referred to as "inserts") an OH of an HO-ODU, to (into) the multiplexed LO-ODU signals that have been output from the ODU multiplexing processing unit 2212 so as to generate an HO-ODU signal. That is, the LO-ODU signals are mapped to the HO-ODU signal.

The OTU processing unit 24 adds an OH of an OTU and an FEC code to the HO-ODU signal that has been generated in the HO-ODU processing unit 23 so as to generate an OTUj signal, and transmits the HO-ODU signal, for example, to a transmission path of the OTN 1. Here, similar to "k" of the OTUk signal, in "j" of the OTUj signal, "j=1, 2, 3 or 4" is satisfied, and "j=k" or "j≠k" may be satisfied.

The GW-ADM 20 may include a function to process communication, in the reverse direction, from the OTN 2-1 to the client network, which is not illustrated in FIG. 2. For example, when the GW-ADM 20 receives an OTNj signal from the transmission path of the OTN 1, the GW-ADM 20 processes an OH of the received OTNj signal.

In addition, the GW-ADM 20 de-maps LO-ODU signals that have been mapped to the payload of the OTNj signal. The de-mapped LO-ODU signals are subjected to the cross-connect in the XC processing unit 2211 so as to correspond to a client network of the output destination, and the LO-ODU signals are sorted to a client interface that corresponds to the output destination client network.

The client interface processes (terminates, monitors, changes, and the like) the OHs of the LO-ODU signals that have been received from the XC processing unit 2211, de-maps the client signals from the payload, and transmits the client signals to the client network.

As described above, when the GW-ADM 20 relays an OTN signal transmitted and received between the client network and the OTN 1, the GW-ADM 20 may change an output destination network flexibly by executing the XC processing for the LO-ODU signals that have been mapped to the OTN signal.

Figure 3:
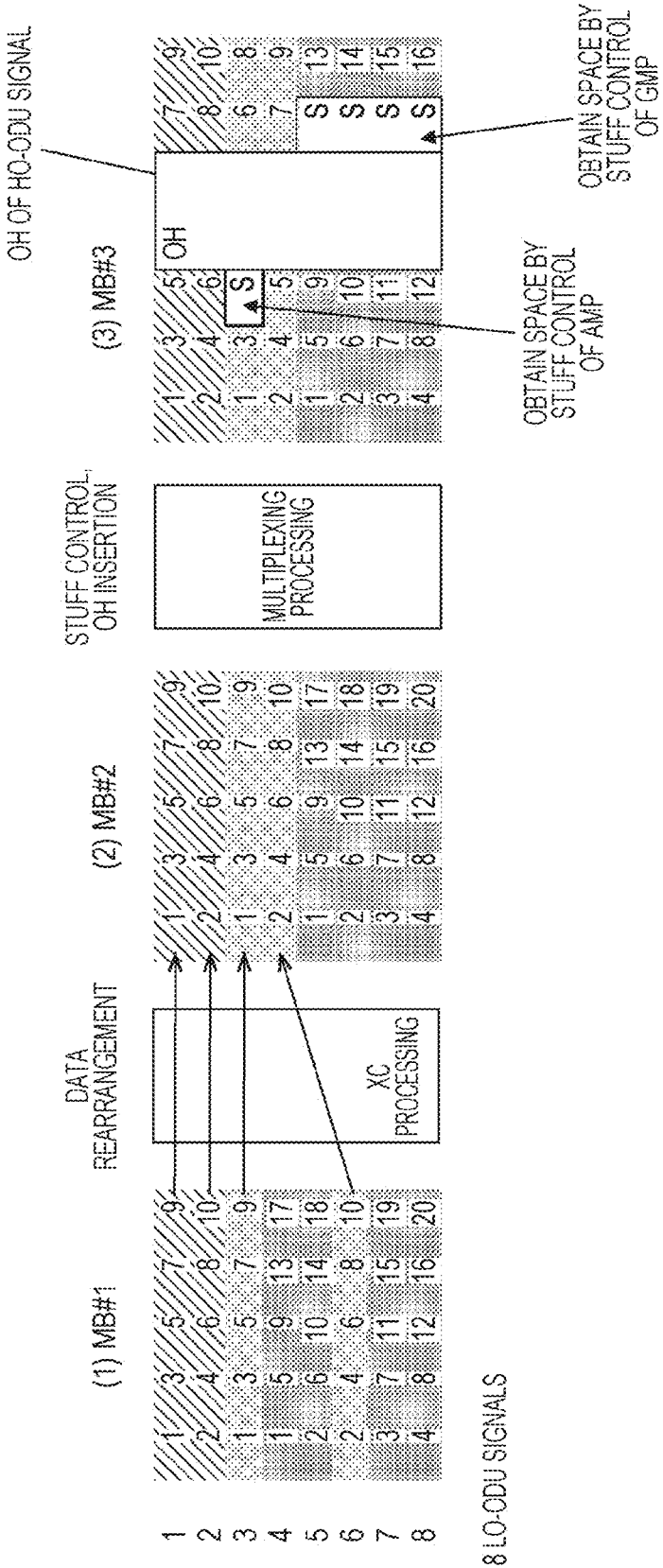
FIG. 3 is a schematic diagram of an example of XC processing and multiplexing processing of LO-ODU signals.

FIG. 3 is a schematic diagram of an example of the XC processing and the multiplexing processing of LO-ODU signals. In FIG. 3, as a non-limited example, a case is illustrated in which eight parallel LO-ODU signals are multiplexed in the ODU multiplexing processing unit 2212 after having been subjected to the XC processing in the XC processing unit 2211.

In (1) of FIG. 3, numbers in a matrix block MB #1 of "eight rows×five columns" formed by the eight parallel LO-ODU signals #1 to #8 indicate orders of pieces of data in a byte, which are mapped to the LO-ODU signals #1 to #8.

As illustrated in the examples of (1) and (2) of FIG. 3, the matrix block MB#1 corresponds to, for example, data structure illustrated in a matrix block MB#2 obtained after having been subjected to the XC processing in the XC processing unit 2211.

That is, in the example of (1) and (2) of FIG. 3, the LO-ODU signals #4 to #6 that respectively correspond to the fourth to the sixth rows of the matrix block MB#1 are respectively rearranged to the fifth, sixth, and fourth rows of the matrix block MB#2 after having been subjected to the XC processing. That is, in the XC processing in this example, rearrangement of signals is performed for each row of the matrix block MB#1.

The LO-ODU signals #1 to #8 that have been rearranged as illustrated in the data structure of the matrix block MB#2 are multiplexed in the HO-ODU signal in the ODU multiplexing processing unit 2212.

At that time, as illustrated in the example of (3) of FIG. 3, the ODU multiplexing processing unit 2212 provides a free field (may be referred to as "space") into which an OH of the HO-ODU signal is to be inserted, for the matrix block MB#2 having the input data structure (see the MB#3 of FIG. 3).

In addition, the ODU multiplexing processing unit 2212 provides a space into which a stuff byte (S) is to be inserted, for the matrix block MB#2 having the input data structure, by stuff control (see the MB#3 of FIG. 3). Here, "space" may be provided by shifting data temporally. The data shift may be referred to as "barrel shift", as described above.

The stuff byte is an example of information used to absorb (may be referred to as "adjust") a frequency deviation of the client signal, at the time of mapping of LO-ODU signals corresponding to client signals to an HO-ODU signal (may be referred to as "frequency adjustment information").

The stuff byte is referred to as a justification control (JC) byte, and has a positive or negative stuff byte. The positive stuff byte is referred to as a positive (P) JC byte, and the negative stuff byte is referred to as a negative (N) JC byte.

The frequency adjustment of the client signal includes an AMP and a GMP.

In the AMP, a stuff byte is inserted into a fixed position of the payload of the HO-ODU signal. In the GMP, stuff bytes are inserted into the payload of the HO-ODU signal so as to be evenly dispersed, and the insertion position is variable.

Thus, the ODU multiplexing processing unit 2212 performs insertion of a stuff byte (may be referred to as "stuff control" or "stuff processing"), in accordance with the AMP scheme and the GMP scheme.

Here, the above-described XC processing unit 2211 and ODU multiplexing processing unit 2212 respectively perform rearrangement and multiplexing of signals for each LO-ODU signal, so that the capacity of the OTU signals is increased, that is, the number of LO-ODU signals that are processing targets is also increased as the value of "k(j)" becomes larger. In addition, when the number of ports of the OTU signals is increased, the number of LO-ODU signals that are processing targets is also increased.

Therefore, the circuit scale of the signal processing unit 22 including the XC processing unit 2211 and the ODU multiplexing processing unit 2212 is also increased as the capacity or the number of ports of the OTU signals is increased. When the circuit scale is increased, for example, there is a possibility that the signal processing unit 22 is not achieved by a single integrated circuit, and that the power consumption is increased. As an example of the integrated circuit, there are a large scale integration (LSI), a field programmable gate array (FPGA), an application specific integrated circuit (ASIC), and the like.

Figure 4:
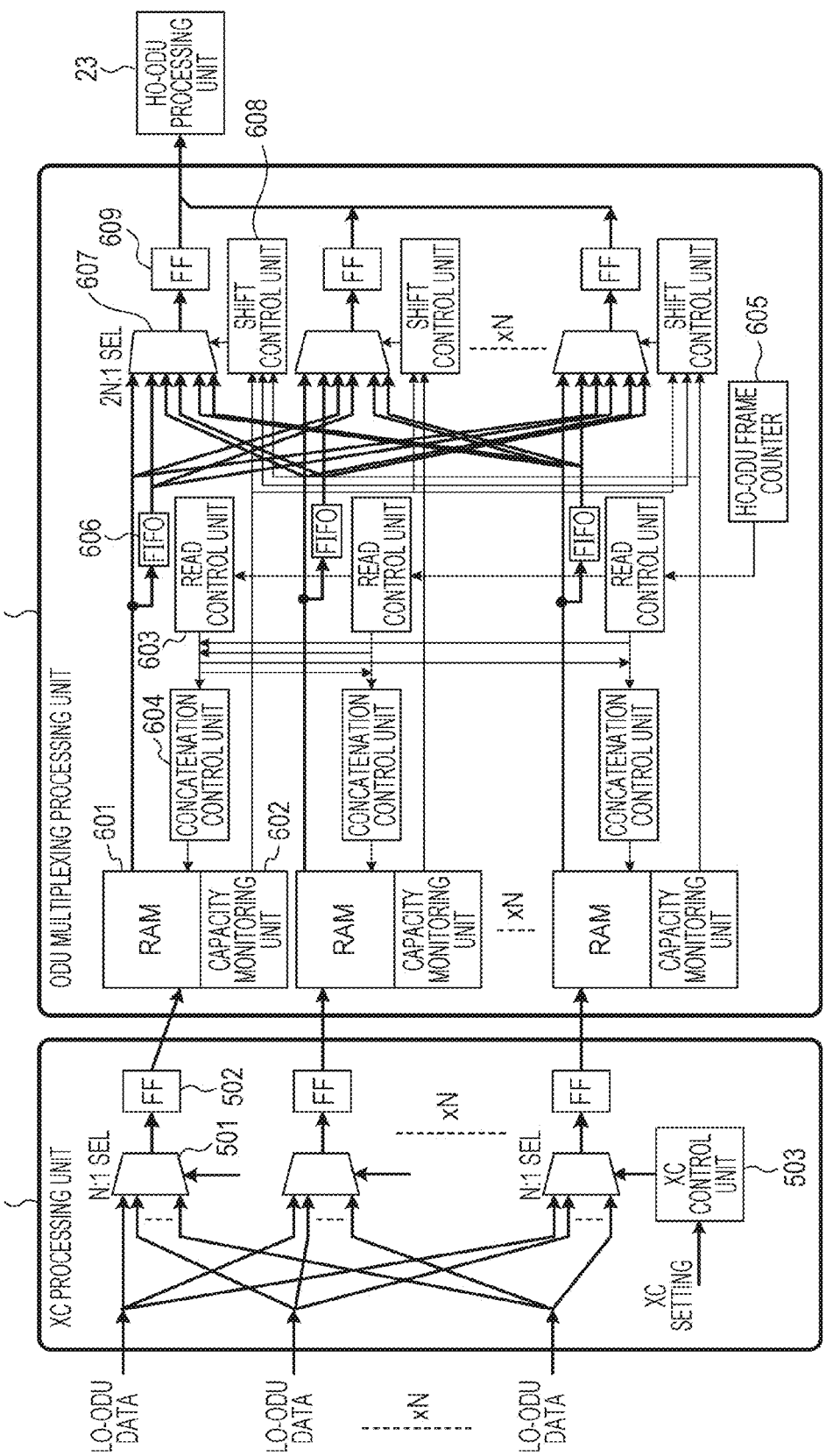
FIG. 4 is a block diagram illustrating a configuration example of a signal processing unit that achieves the XC processing and the multiplexing processing illustrated in the example of FIG. 3.

FIG. 4 is a block diagram illustrating configuration examples of the XC processing unit 2211 and the ODU multiplexing processing unit 2212. The XC processing unit 2211 illustrated in FIG. 4 includes, for example, N (here, "N" is an integer of two or more) N:1 selectors 501 and N flip flops (FF) 502.

N pieces of parallel LO-ODU data are input to each of the N N:1 selectors 501. Each of the N:1 selectors 501 selects and outputs one of the N pieces of parallel LO-ODU data byte by byte, in accordance with XC setting. The XC setting is performed, for example, by an XC control unit 503.

The piece of LO-ODU data that has been selected and output from each of the N:1 selectors 501 is subjected to delay time adjustment in the corresponding FF 502, and input to the ODU multiplexing processing unit 2212.

The ODU multiplexing processing unit 2212 includes, for example, N RAMs 601 respectively corresponding to the N N:1 selectors 501. The pieces of LO-ODU data that have been selected and output from the corresponding N:1 selectors 501 are sequentially written to the RAMs 601. For example, in the case of "N=8", pieces of data of the eight parallel LO-ODU signals #1 to #8 illustrated in the example of FIG. 3 are respectively written to the eight RAMs 601.

The pieces of LO-ODU data that have been written to the RAMs 601 are read, for example, byte by byte, by N sets of read control units 603 and concatenation control units 604 provided correspondingly to the RAMs 601.

The read control unit 603 performs read control of the LO-ODU data mapped to the HO-ODU frame, based on count information of an HO-ODU frame counter 605.

At that time, reading of the pieces of LO-ODU data that form a concatenation group is controlled by the concatenation control unit 604 so as to be performed for each concatenation group.

The LO-ODU data that has been read from each of the N RAMs 601 is, for example, branched into two pieces and transmitted through signal lines of two systems respectively. As an example, a first-in-first-out (FIFO) memory 606 is provided in one of the signal lines, and the FIFO memory 606 is not provided in the other signal line.

Thus, the LO-ODU data transmitted through the one of the signal lines is delayed (that is, time-shifted) as compared with the LO-ODU data transmitted through the other signal line, in accordance with a temporary holding time in the FIFO memory 606.

Each of the pieces of LO-ODU data transmitted through the signal lines of the two systems is branched into N pieces and input to N 2N:1 selectors 607, respectively. That is, pieces of data that do not pass through the FIFO memories 606 and pieces of data that pass through the FIFO memories 606, which are read from the N RAMs 601, are input to 2N input ports of each of the 2N:1 selectors 607.

Each of the 2N:1 selectors 607 selects and outputs, for example, byte by byte, one of the pieces of LO-ODU data that have been input through the 2N input ports. The selection and output are controlled, for example, by a shift control unit 608 provided for each of the 2N:1 selectors 607.

Each of the shift control units 608 controls selection output timing at the corresponding 2N:1 selector, based on a monitoring result by the capacity monitoring unit 602 provided for each of the RAMs 601. The capacity monitoring unit 602 monitors, for example, the capacity of data that has been written to the RAM 601 (that is, data in the standby state for reading), based on a difference between a write address and a read address of the data for the RAM 601.

The stuff control (that is, barrel shift) illustrated in the example of FIG. 3 may be performed by the above-described FIFO memory 606, 2N:1 selector 607, and shift control unit 608. The LO-ODU data that has been selected in each of the 2N:1 selectors 607 is output to the HO-ODU processing unit 23 after having been subjected to the output timing adjustment in a FF 609.

As described above, in the configuration illustrated in the example of FIG. 4, in the processing in which an HO-ODU signal is generated from LO-ODU signals, selection and shift of data are repeatedly performed using the selectors 501 and 607, the FIFO memory 606, and the like.

That is, in the XC processing unit 2211, the N N:1 selectors 501, each of which performs data selection byte by byte, are provided in order to rearrange the pieces of LO-ODU data. In addition, in the ODU multiplexing processing unit 2212, the N 2N:1 selectors 607, each of which performs data selection byte by byte, are provided in order to perform stuff control, and the N FIFO memories 606 to delay data are provided.

In the configuration illustrated in the example of FIG. 4, when the number of ports or the capacity of the OTU signals is increased, the value of "N" is increased, so that as described above, there is a possibility that the circuit scale is increased, and the signal processing unit 22 is not achieved by a single LSI or a single FPGA, and the power consumption is increased.

Therefore, in the embodiment, for example, the XC processing and the ODU multiplexing processing may be combined by trying various measures for controlling the selection output and reading of data stored in the memory, without executing the XC processing and the ODU multiplexing processing separately in order, as illustrated in the example of FIG. 4.

For example, read timing of the memory and data selection timing are controlled so that the data selection and the barrel shift for stuff control are performed at almost the same time. As a result, even when the number of ports or the capacity of OTU signals is increased, increases in the circuit scale and the power consumption of the signal processing unit 22 may be suppressed.

Figure 5:
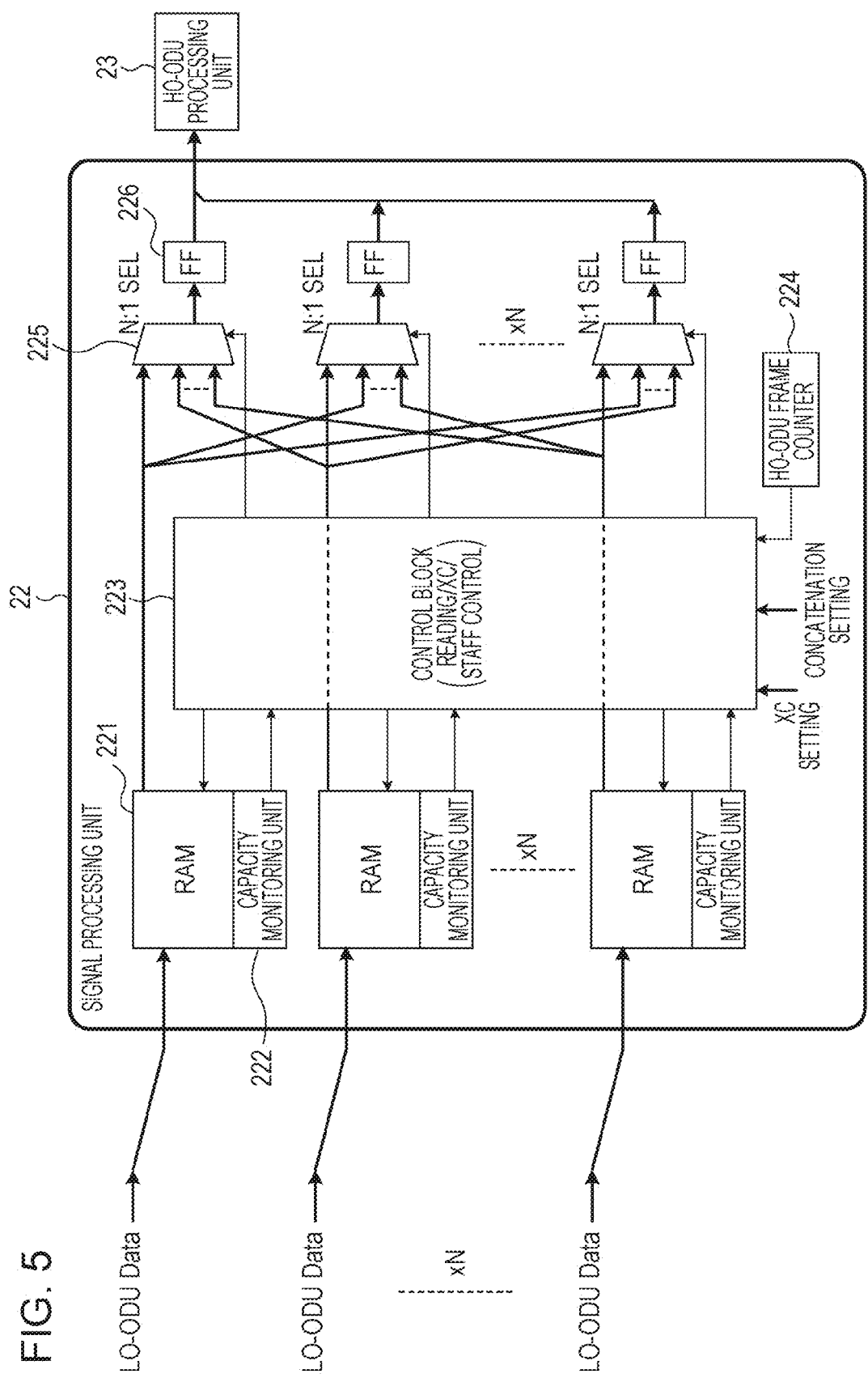
FIG. 5 is a block diagram illustrating a configuration example of a signal processing unit according to an embodiment.

FIG. 5 is a diagram illustrating a configuration example of a signal processing unit 22 according to an embodiment. The signal processing unit 22 illustrated in FIG. 5 includes, for example, N RAMs 221 respectively corresponding to N pieces of parallel input LO-ODU data, capacity monitoring units 222 respectively corresponding to the RAMs 221, and a control block 223.

In addition, the signal processing unit 22 illustrated in FIG. 5 further includes, for example, an HO-ODU frame counter 224, N N:1 selectors 225, and N FFs 226.

Each of the RAMs 221 stores the input one piece of parallel LO-ODU data. The RAM 221 is an example of a memory.

The capacity monitoring unit 222 monitors the capacity of the data that has been written onto the RAM 221 (that is, data in the standby state for reading), for example, based on a difference between a write address and read address of the data for the RAM 221.

The control block 223 controls reading of the LO-ODU data stored in each of the RAMs 221 and data selection in each of the N:1 selectors 225. The data reading from the RAM 221 and the data section in the N:1 selector 225 may be performed, for example, byte by byte.

Here, the control block 223 may achieve data shift corresponding to stuff control (barrel shift) in accordance with the multiplexing position of the LO-ODU signals in the HO-ODU signal by controlling data reading timing from the RAM 221. That is, the stuff control FIFO memory illustrated in the example of FIG. 4 may become redundant by integrating (may be referred to as "aggregating") the stuff control FIFO memory illustrated in the example of FIG. 4 and the RAM 221 in the configuration of FIG. 5.

The control of the data read timing corresponding to the stuff control is performed, for example, based on frame information and the like of an HO-ODU signal applied from the HO-ODU frame counter 224.

The data read control from the RAM 211 may be performed based on the setting of a concatenation group (hereinafter may be abbreviated as "concatenation setting"). For example, the control block 223 may perform data read control of the RAM 211 based on the concatenation setting information so that a set of a plurality of pieces of LO-ODU data that form an identical concatenation group is read from the corresponding RAM 221.

In addition, the control block 223 may achieve data rearrangement corresponding to the XC processing by individually controlling data selection timing in each of the N:1 selectors 225 based on the XC setting information. Therefore, commonality of the selectors and the FFs in the XC processing unit 2211 illustrated in the example of FIG. 4 FIG. 5 may be achieved for the N:1 selector 225 and the FF 226.

Thus, the control block 223 may perform the read control of the RAM 221, the stuff control, and the XC control at the same time. Due to such architecture by which aggregation (integration) of the FIFO memory and the RAM 221 and commonality of selectors are achieved, the circuit scale of the signal processing unit 22 may be reduced as compared with the configuration illustrated in the example of FIG. 4.

The LO-ODU data that has been read by the read control by the control block 223 is branched into N pieces of data, and the N pieces of data are respectively input to the N N:1 selectors 225.

Each of the N:1 selectors 225 selects and outputs one of the N pieces of LO-ODU data that have been read from the N RAMs 221, in accordance with a data selection timing signal (may be referred to as "selection signal" or "control signal") applied from the control block 223. The N N:1 selectors 225 are examples of selection units.

The LO-ODU data that has been selected and output from each of the N:1 selectors 225 is subjected to delay arrangement in the corresponding FF 226, and output to the HO-ODU processing unit 23.

Figure 6:
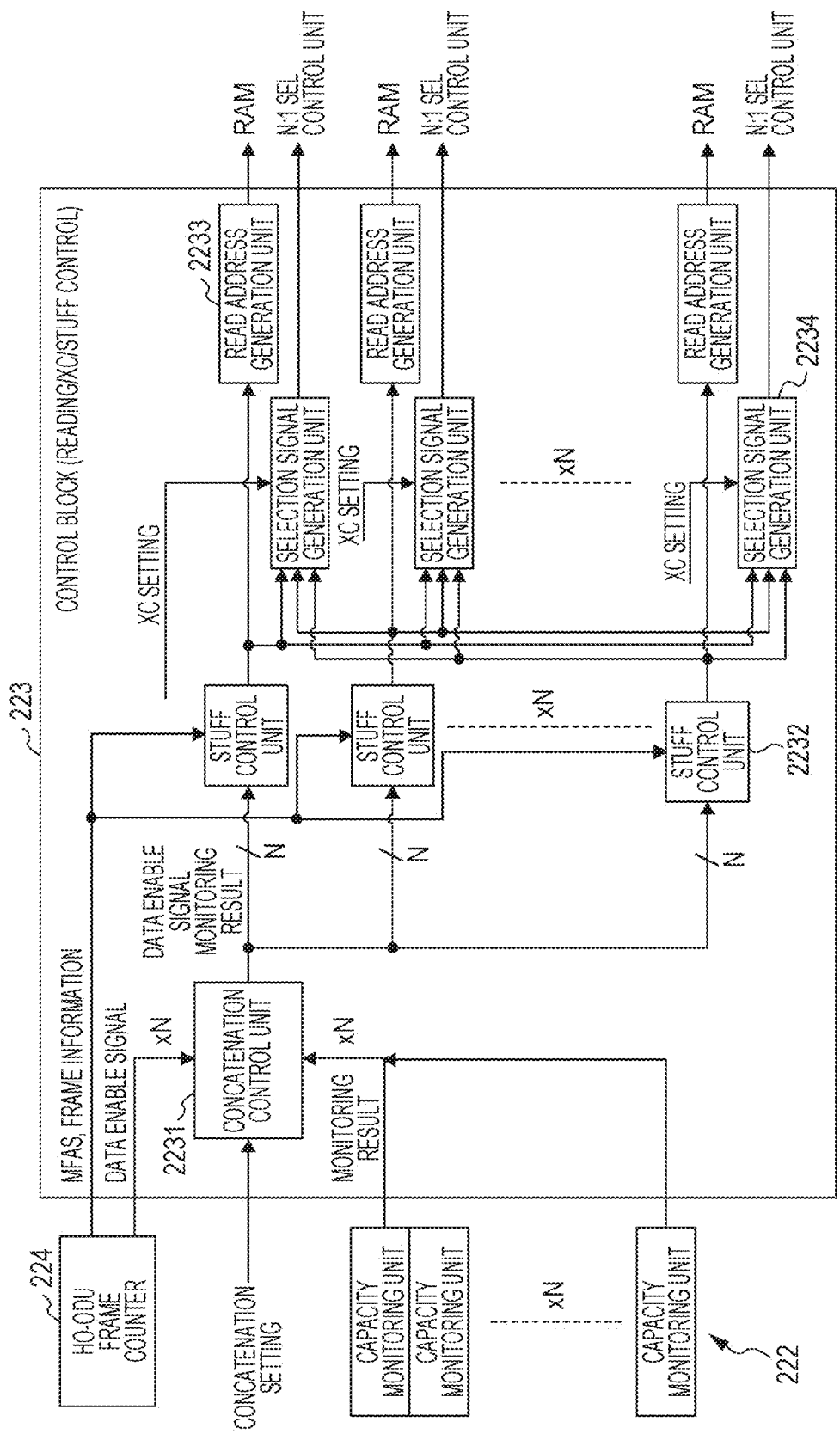
FIG. 6 is a block diagram illustrating a configuration example of a control block illustrated in FIG. 5.

FIG. 6 is a diagram illustrating a configuration example of the above-described control block 223. The control block 223 illustrated in FIG. 6 includes, for example, a concatenation control unit 2231, N stuff control units 2232, N read address generation units 2233, and N selection signal generation units 2234.

The concatenation control unit 2231 generates a set of a monitoring result in each of the capacity monitoring units 222 and a data enable signal of the LO-ODU data, for each of the concatenation groups, based on the concatenation setting information. The set of the monitoring result and the data enable signal (hereinafter, may be collectively referred to as "data enable information") is applied to each of the stuff control units 2232.

Each of the stuff control unit 2232 identifies stuff control timing, based on an MFAS and frame information of the HO-ODU signal. The MFAS is abbreviation of a multi-frame alignment signal. The identified stuff control timing is applied to the corresponding read address generation unit 2233 and each of the selection signal generation units 2234, with the data enable information.

Each of the read address generation units 2233 generates a read address of the corresponding RAM 221, based on the data enable information applied from the stuff control unit 2232 (for example, increments the read address).

At that time, the read address generation unit 2233 determines whether the stuff control is desired at the stuff control timing that has been identified in the stuff control unit 2232, based on the capacity monitoring result of the RAM 211, and stops the increment of the read address when the stuff control is desired.

Each of the selection signal generation units 2234 generates a selection signal applied to the N:1 selector 225, based on the XC setting information and the data enable information. At that time, when the stuff control is desired at the stuff control timing that has been identified in the stuff control unit 2232, the selection signal generation unit 2234 adjusts (may be referred to as "updates") the enable timing of the individual selection signal. As a result, data rearrangement corresponding to the stuff control may be performed.

Figure 7:
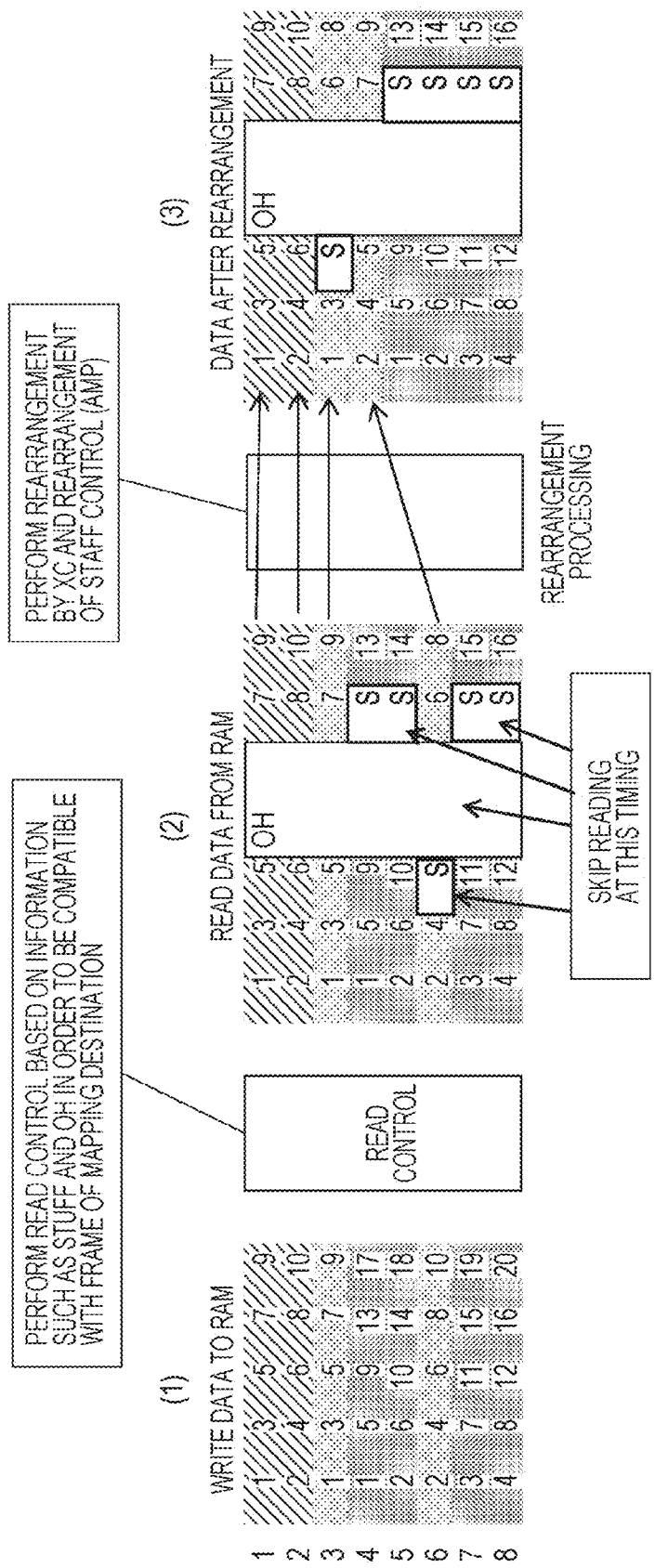
FIG. 7 is a schematic diagram illustrating an operation example of the signal processing unit illustrated in FIGS. 5 and 6.

FIG. 7 is a diagram illustrating an example of read processing and rearrangement processing of pieces of LO-ODU data by the signal processing unit 22 described with reference to FIGS. 5 and 6, as a comparative example of FIG. 3. Here, (1) of FIG. 7 indicates an example of write data to the RAM 221, and (2) of FIG. 7 indicates an example of read data from the RAM 221, and (3) of FIG. 7 indicates an example of data after rearrangement by each of the N:1 selectors 225.

As illustrated in the examples of (1) and (2) in FIG. 7, the signal processing unit 22 performs read control of the RAM 221, based on an MFAS and frame information of an HO-ODU signal that is a mapping destination of pieces of LO-ODU data taking the stuff position and an OH of the HO-ODU signal into consideration.

For example, as illustrated in the example of (2) in FIG. 7, the control block 223 skips (may be referred to as "pauses") data reading from the RAM 211, at timing corresponding to an area into which an OH or a stuff byte (S) is inserted.

As a result, the LO-ODU data that have been read from the RAM 221 is input to each of the N:1 selectors 225 in a state in which free fields (spaces) into which the OH and the stuff byte of the HO-ODU signal are to be inserted are prepared depending on the number of reading skips.

In addition, as illustrated in the example of (3) in FIG. 7, when data selection output timing of each of the N:1 selectors 225 is individually controlled, in accordance with the selection signal that has been generated in the control block 223, based on the XC setting information, data rearrangement corresponding to the XC setting is performed. As a result, data structure that is equivalent to the data structure after the ODU multiplexing processing illustrated in the example of (3) in FIG. 3 is obtained by the signal processing unit 22.

Figure 9:
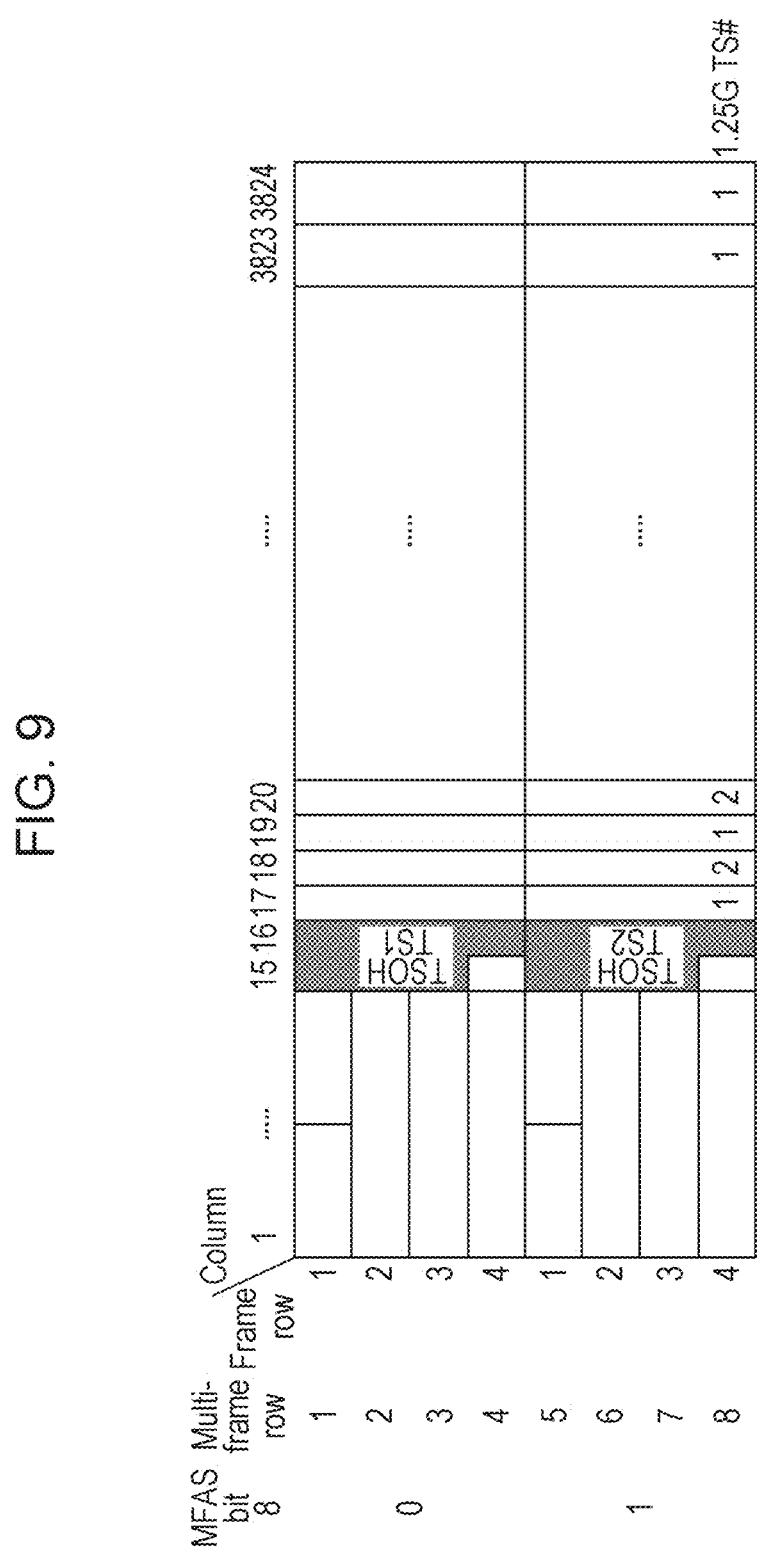

FIGS. 8A and 8B are schematic diagrams illustrating examples of data rearrangement in accordance with stuff control of an AMP for optical channel payload unit) (OPU) k signals (for example, k=1) multiplexed in an ODUk signal. FIG. 9 is a diagram illustrating a format example of an OPU1 signal, and FIG. 10 is a diagram illustrating an OH allocation example of the OUP1 signal illustrated in the example of FIG. 9.

Figure 10:
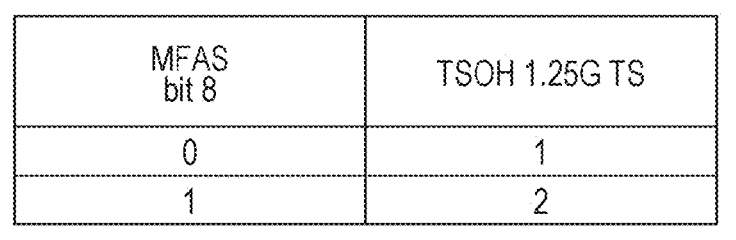

In FIG. 9, an MFAS has a value of 1 byte (8 bits) incremented in the range of "0 to 255", and as illustrated in the example of FIG. 10, a tributary slot (TS) to which an OH is allocated at the eighth bit of the MFAS is indicated. For example, it is indicated that the OH is allocated to "TS1" when the eighth bit of the MFAS is "0", and the OH is allocated to "TS2" when the eighth bit of the MFAS is "1".

Thus, when the stuff control unit 2232 illustrated in the example of FIG. 6 performs stuff control of an AMP, the stuff control unit 2232 identifies whether "0" or "1" is indicated at the eighth bit of the MFAS, and performs the stuff control (data rearrangement) in accordance with the identification result.

For example, when the eighth bit of the MFAS is "1", as illustrated in the example of FIG. 8A, stuff control of a stuff byte (S) for "TS2" is performed. In addition, when the eighth bit of the MFAS is "0", as illustrated in the example of FIG. 8B, stuff control of a stuff byte (S) for "TS1" is performed.

In addition, in stuff control of an AMP for an OPU2 signal of "k=2", similar to the above-described case of the OPU1 signal, stuff control in accordance with allocation information of an OH indicated by a MFAS is performed.

Figure 11:
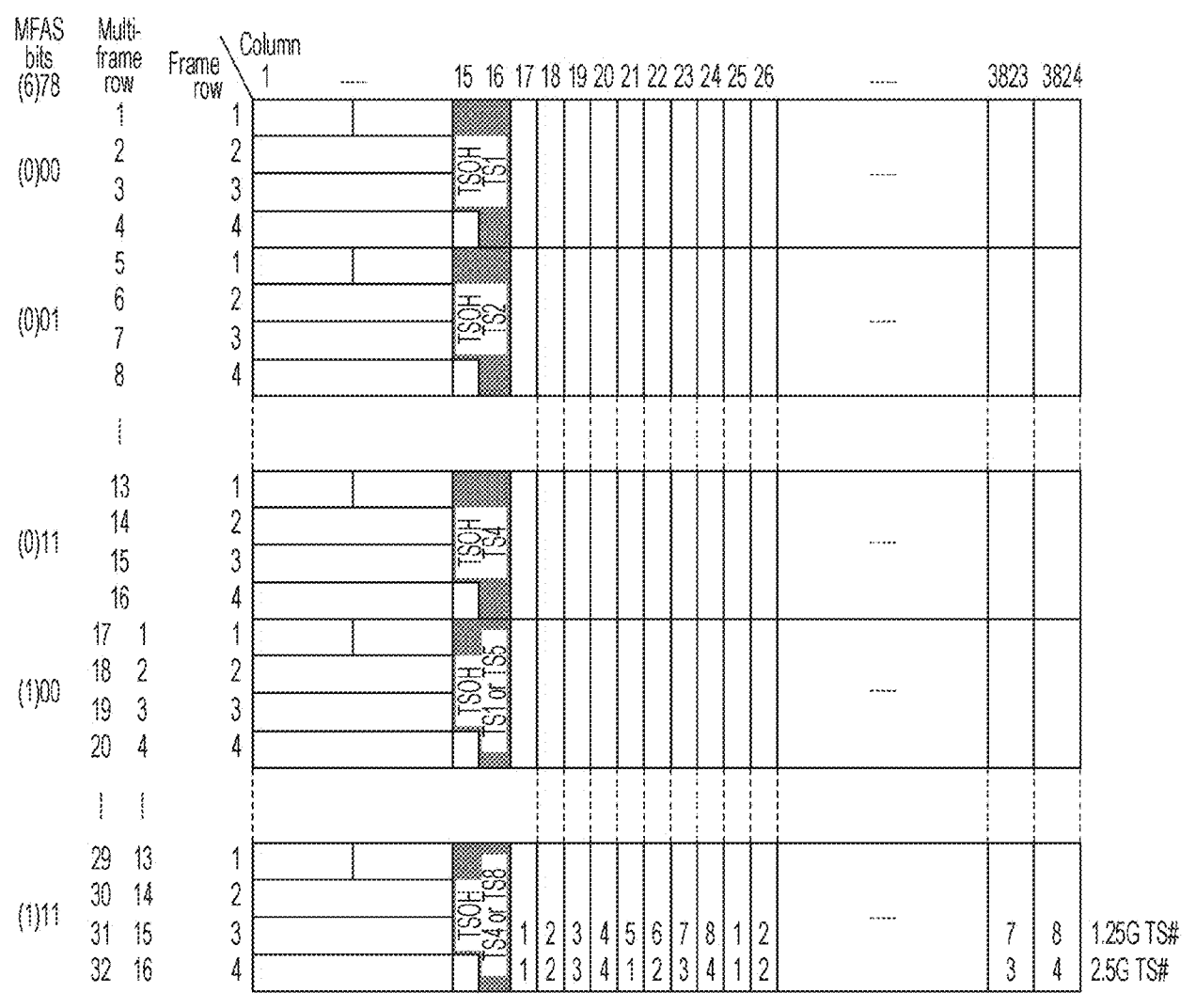

FIG. 11 is a diagram illustrating a format example of an OPU2 signal, and FIG. 12 is a diagram illustrating an OH allocation example in an MFAS of an OPU2 signal. As illustrated in the example of FIG. 12, in a case of an OPU2 signal, an OH allocated to one of "TS1" to "TS8" in the sixth to eighth bits of the MFAS is indicated.

Thus, when the stuff control unit 2232 performs stuff control of an AMP for an OPU2 signal, the stuff control unit 2232 performs stuff control in accordance with the identification result of the sixth to eighth bits of the MFAS. Such an example is illustrated in FIGS. 13A and 13B.

Figure 13A:
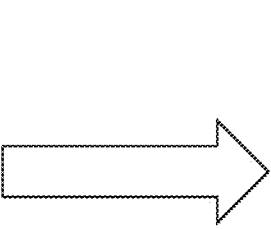
FIGS. 13A and 13B are schematic diagrams illustrating examples of stuff control of an AMP for the OPU2 signal.
Figure 13B:
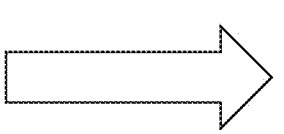

FIG. 13A is, for example, a diagram illustrating stuff control of a stuff byte (S) for "TS1". In FIG. 13A, an example is illustrated in which the position of a stuff byte (S) is not changed eventually. FIG. 13B illustrates a diagram illustrating an example of stuff control of a stuff byte (S) for "TS" that is different from "TS1". In FIG. 13B, the position of a stuff byte (S) in the HO-ODU signal is determined depending on an identified "TS" number.

The stuff control of the GMP is not performed at frame position (timing) that has been determined in advance, differently from the AMP. For example, as schematically illustrated in FIG. 14, in the GMP, stuff control may be performed so that stuff bytes (S) are evenly inserted into the OPUk payload.

Figure 15:
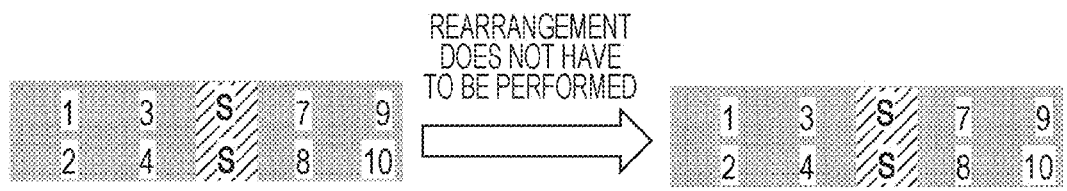
FIG. 15 is a schematic diagram illustrating an example of stuff control of the GMP.

That is, in the GMP, stuff control may be performed for each TS group in which a plurality of TSs are aggregated. In the case of an OPU2 signal, for example, stuff control may be performed for each TS group in which eight TSs are aggregated. Therefore, in the GMP, for example, as schematically illustrated in FIG. 15, rearrangement of the stuff bytes (S) does not have to be performed.

As described above, in the above-described embodiments, when overall control of data selection control and reading control of pieces of LO-ODU data that are multiplexed in an HO-ODU signal from the memory is performed, the XC control and the stuff control may be processed at the same time.

Thus, even when the capacity of the HO-ODU signal is increased, the circuit scale of the signal processing unit 22 may be reduced. Therefore, the signal processing unit 22 may be achieved easily by the minimum number of LSIs and FPGAs, and the functions of the signal processing unit 22 may be included in a single device package easily. Due to the reduction of the circuit scale, the power consumption is also reduced.

In the above-described embodiments, the case is described in which a plurality of LO-ODU signals that are examples of low-order signals are multiplexed in an HO-ODU signal that is an example of a high-order signal. However, as long as a plurality of low-order signals are multiplexed in a high-order signal, the above-described embodiments (signal processing unit 22) may be applied for signal processing of the low-order signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device to multiplex in a first signal a plurality of second signals each having a low rate as compared with the first signal, the transmission device comprising:
   a plurality of memories configured to store the plurality of second signals;
   at least one processor configured to select one of the second signals read from the plurality of memories; and
   the at least one processor configured to control read timing to read the plurality of second signals from the plurality of memories and signal selection timing to select the one of the second signals by the at least one processor so as to execute rearrangement processing of the plurality of second signals read from the plurality of memories in accordance with cross-connect setting information for the plurality of second signals and shift processing of the plurality of second signals read from the plurality of memories in accordance with multiplexing positions of the plurality of second signals for the first signal;
   wherein the at least one processor skips the reading of the plurality of second signal, at timing corresponding to a position at which pieces of frequency adjustment information of the plurality of second signals for the first signal are multiplexed in the first signal.

2. A transmission device to multiplex in a first signal a plurality of second signals each having a low rate as compared with the first signal, the transmission device comprising:
   a plurality of memories configured to store the plurality of second signals;
   at least one processor configured to select one of the second signals read from the plurality of memories; and
   the at least one processor configured to control read timing to read the plurality of second signals from the plurality of memories and signal selection timing to select the one of the second signals by the at least one processor so as to execute rearrangement processing of the plurality of second signals read from the plurality of memories in accordance with cross-connect setting information for the plurality of second signals and shift processing of the plurality of second signals read from the plurality of memories in accordance with multiplexing positions of the plurality of second signals for the first signal;
   wherein the at least one processor controls the read timing and the signal selection timing for the plurality of second signals that belong to an identical concatenation group, in accordance with concatenation setting of the plurality of second signals and commonly for the concatenation group.

3. The transmission device according to claim 1, wherein the at least one processor controls the read timing and the signal selection timing for the plurality of second signals that belong to an identical concatenation group, in accordance with concatenation setting of the plurality of second signals and commonly for the concatenation group.

4. A transmission device to multiplex in a first signal a plurality of second signals each having a low rate as compared with the first signal, the transmission device comprising:
   a plurality of memories configured to store the plurality of second signals;
   at least one processor configured to select one of the second signals read from the plurality of memories; and
   the at least one processor configured to control read timing to read the plurality of second signals from the plurality of memories and signal selection timing to select the one of the second signals by the at least one processor so as to execute rearrangement processing of the plurality of second signals read from the plurality of memories in accordance with cross-connect setting information for the plurality of second signals and shift processing of the plurality of second signals read from the plurality of memories in accordance with multiplexing positions of the plurality of second signals for the first signal;
   wherein the at least one processor skips the reading of the plurality of second signal, at timing corresponding to a position at which pieces of frequency adjustment information of the plurality of second signals for the first signal are multiplexed in the first signal so as to generate free fields into which overhead data and stuff control data are to be inserted in the first signal.

* * * * *